United States Patent Office 3,199,038
Patented Aug. 3, 1965

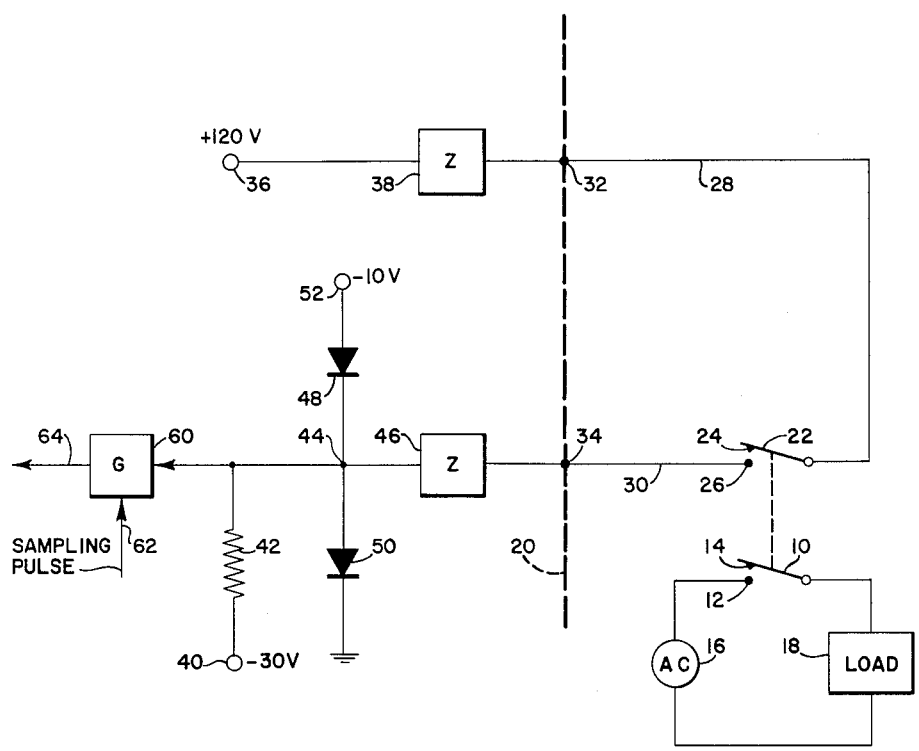

3,199,038
CONTACT CLOSURE DETECTOR
John W. Cannon, San Diego, Calif., assignor, by mesne assignments, to Control Data Corporation, Minneapolis, Minn., a corporation of Minnesota
Filed Feb. 1, 1961, Ser. No. 86,477
3 Claims. (Cl. 328—171)

This invention relates to a detector circuit and more particularly to a circuit capable of detecting the closure condition of remote contacts.

With the advent of electronic digital computers and the use of such computers to automatically monitor and/or control industrial processes including power plants, steel mills, gas pipe lines, petro-chemical processes and the like, it has become necessary to periodically sense or sample the condition of many remote contacts or switches. The sensing lead or leads to each pair of contacts is required sometimes to traverse relatively long distances before they connect to the control system input. Such length of wire, particularly in electric power generating plants, is subject to having relatively large voltages (often in the order of 600 volts) induced therein which can cause great damage to the computer input circuits. This is particularly true in transistorized computers. In the past, protective networks employed mercury wetted relays to isolate the contact closure inputs from the computer. Unfortunately, such relays are relatively expensive and, where the number of contacts to be sensed is large, say in the order of hundreds, substantially increases the cost of any control system.

The relatively long leads that are required in order to sense the condition of remotely located contacts presents unduly high distributed capacitance to the computer input circuitry which can substantially reduce the rate at which the many contact closure inputs can be accurately sampled. This is particularly true if the computer passes a sampling current across the contacts to determine whether the contacts are opened or closed.

Accordingly, it is an object of this invention to overcome the disadvantages of the prior art contact closure detector circuits.

Another object of this invention is to improve the speed at which the state of contact closures can be detected.

In a preferred form of this invention, a predetermined potential is applied across a voltage divider network. The contacts, whose closure condition is to be detected, are connected to form a portion of the voltage divider network. A detector circuit is coupled to sense a point on the voltage divider network apart from the contacts thereby to detect the voltage and hence the closure condition of the contacts. A pair of clamping diodes are connected to the sensing point such that it assumes one or the other of two different finite potentials depending on the contact closure condition.

Further advantages and features of this invention will become apparent upon consideration of the following description read in conjunction with the drawing wherein the sole figure is a part schematic, part block diagram of a contact closure detector circuit.

Referring now to the sole figure, there is illustrated a first device or contact pair 10 having contacts 12 and 14, respectively. The contacts 12 and 14 of the device 10 may be closed or opened, for example, by a relay (not shown) thereby to connect a source of A.C. voltage 16 to a load 18. The A.C. voltage 16 and load 18 may, for example, be part of a power plant system which is being controlled by a computing system; therefore it is desirable that the computing system be able to determine the state of closure of the first contact pair 10 at any time. This is accomplished, typically, by a second contact pair 22 having contacts 24 and 26, the second contact pair 22 being gauged to operate in the same manner as the first contact pair 10. Sensing leads 28 and 30, respectively, are connected from each of the contacts 24 and 26 of the second contact pair 22 to points 32 and 34, respectively, which constitute the contact closure input to the computing system. In the drawing, the detector portion of the computing system is illustrated to the left of the dashed line 20.

In the detector portion of the system, a first source of positive voltage 36 is connected through an impedance, illustrated by the block 38, which may, for example, be a resistor, to one of the contact closure input terminals 32. In similar manner, a negative source of voltage 40 is connected through a resistor 42 to a common point 44 thence through a second impedance, illustrated by the block 46 which may, for example, be a resistor, to the other one of the contact closure input terminals 34. A pair of unidirectional conducting devices (diodes) 48 and 50, respectively, are connected in series between a source of negative potential 52 and ground. The junction between the diodes 48 and 50 is at the common point 44 such that the common point 44 is clamped to either the voltage of the negative potential source 52 or ground. The diodes 48 and 50, respectively, may, for example, be power type diodes such as 1N320A. For convenience, the voltages chosen (ground and source 52) correspond to the computing systems true and false logic levels.

This configuration includes the sensing leads 28 and 30 which may be relatively long and traverse distances of a mile or so if the system installation is a large one. These sensing leads 28 and 30, when connected between the positive and negative potential sources 36 and 40, respectively, form a voltage divider which includes the first impedance 38, the sensing lead 28, the contacts 24 and 26, the lead 30, the impedance 46, and the resistor 42. Depending upon whether the device 10 is opened or closed, the contacts 24 and 26 of the second contact pair 22 varies the voltage at the common point 44 of the voltage divider.

The potential at the common point 44 in the voltage divider is applied to one input of a two-input "and" gate 60. The remaining input to the two-input "and" gate 60 is supplied by a sompling pulse input 62 which may provide periodic, relatively short sampling pulses from the computer (not shown). The circuit of this invention protects the computer system inputs, i.e., the "and" gate 60. Typically, the two-input "and" gate 60 provides an output in the event that both of its inputs from the sampling pulse 62 and the common point 44 are both at ground level. The sampling pulses, may be positive-going pulses that vary between a quiescent value of −10 volts and ground. When the contacts are closed, as will be described below, the "and" gate 60 produces a positive-going output pulse on the output line 64 which varies between the quiescent value of −10 volts and ground when interrogated by the sampling pulse. Conversely, when the contacts to be sensed are open, the "and" gate 60 maintains a steady quiescent output voltage level of −10 volts. These voltage levels of ground and −10 volts are set forth as illustrative values that are suitable for direct application to digital computer circuitry. Other voltage levels may be used as desired.

More specifically, if the first contact pair 10 is closed, the second pair 22 is also closed such that the contacts 24 and 26 are engaged. The potential appearing at the common point 44 tends to rise to some positive value above ground, but is prevented from doing so due to the conduction or clamping action of the second diode 50. At the same time, the first diode 48 is reverse biased and hence, non-conducting. The ground potential at the common point 44 allows the gate 60 to pass the sampling pulse indicating that the first contact pair 10 is closed.

If now, due to the inadvertent application of high voltage such as the falling of a power line across the sensing lead wires 28 or 30 or the placement of the other lines too close to these sensing lead wires such that induced voltage appears in the leads 28 or 30, the large values of the impedances 38 and 46 reduce any current flow through the clamping diodes 48 and 50 and the gate 60 to a value measured in milliamperes. The diodes 48 and 50 are capable of handling the milliampere current load and clamping the common point 44 to the values acceptable to the gate 60. Actually, the diodes are capable of handling several amperes of current without causing serious damage thereto. Before the diodes are damaged under a sustained over-voltage condition, the impedances 38 and 46 will receive such a load as to burn up themselves thereby protecting the gate 60 and the other computer circuitry (not shown).

If, on the other hand, the first contact pair 10 is opened thereby opening the contacts 24 and 26, current flows from the negative potential source 52 through the diode 48 and the resistor 42 to the second negative potential source 40, thereby maintaining common point 44 at the same potential as the source 52, namely, —10 volts. Now the sampling pulse on the line 62 cannot provide an output pulse since the gate 60 is not primed. This —10 volt signal level indicates to the computer system (not shown) that the first contact pair 10 is open. If a stray voltage is induced to the line 33, such voltage is attenuated by the impedance 46 and clamped by the diodes 48 and 50 so as to prevent damage, as described hereinbefore, to the gate 60 and other computer circuitry (not shown).

Another advantage of this invention is the fact that the voltage level at the common point 44 is established by the contact pair 22, thus eliminating the need for driving the distributed capacity of the lines 28 and 30 with the sampling pulse current. Thus, the gate 60 is either primed or unprimed at the time of the occurrence of the sampling pulses on the line 62 and no time delay is incurred at the time of sampling. The effect of the distributed capacitance due to the relatively long leads 28 and 30 is very small even though relatively short, rapidly occurring sampling pulses are applied to the line 62.

There has thus been described a relatively simple, economic solid state detector circuit that is capable of detecting the closure condition of a pair of contacts. The detector circuit has provision for protecting the arrangement from inadvertent applications of abnormal voltages thereby preventing damage to the computer's sampling circuitry.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. A protector circuit for detecting the closure of a remote switch comprising: a contact pair ganged to said switch and operative therewith between open and closed positions, a first voltage source, a first impedance connecting said voltage source to one contact of the contact pair, a second voltage source, a first and second diode connected in series at a junction point and joining said second voltage source to a point of reference potential through said first diode, the junction point and the second diode respectively, a second impedance connecting said junction point to the other contact of said contact pair, a third voltage source, a third impedance connecting said junction point to said third voltage source, a gate, and means connecting the gate to said junction point whereby the potential at said junction is supplied as an input to the gate; said second, third and reference potentials having values to permit said first diode to be forward biased and said second diode to be reverse biased when said contact pair is open; and said first, second, third and reference potentials having values to permit said second diode to be forward biased and the first diode to be reversed biased when said contact pair is closed.

2. A protector circuit for detecting the closure of a remote switch as set forth in claim 1 wherein said first voltage source is positive, the point of reference potential is ground, the second voltage source is negative, and the third voltage source is more negative than said second source.

3. A protector circuit for detecting the closure of a remote switch as set forth in claim 1 further comprising means for supplying periodic sampling pulses to said gate as a second input thereto.

References Cited by the Examiner

UNITED STATES PATENTS

| 2,627,039 | 1/53 | MacWilliams | 307—88.5 |
| 2,775,714 | 12/56 | Curtis | 307—88.5 |
| 2,820,215 | 1/58 | Hughes | 340—252 X |
| 2,825,050 | 2/58 | Hausten | 340—252 X |
| 2,853,630 | 9/58 | Lane et al. | 307—88.5 |
| 2,939,001 | 5/60 | Deerhake et al. | 328—41 X |

OTHER REFERENCES

Richards: Digital Computer Components and Circuits (text), January 1957 (page 156 relied on).

Hurley: Junction Transistor Electronics, Wiley & Sons, 2nd printing, 1959.

ARTHUR GAUSS, *Primary Examiner.*

HERMAN KARL SAALBACH, *Examiner.*